Nov. 13, 1951 R. K. JACK 2,574,483
CONVERTIBLE TRUCK FLOOR
Filed Oct. 23, 1947 4 Sheets-Sheet 1

INVENTOR.
Robert K. Jack
BY
Strauch + Hoffman
Attorneys

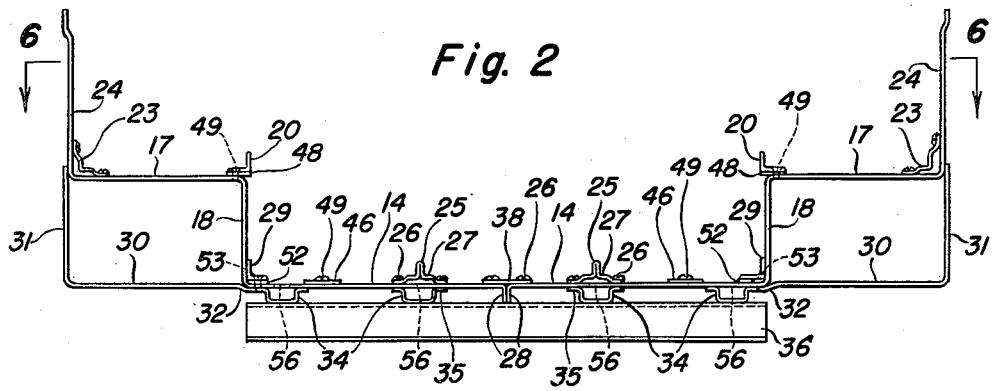
Fig. 2
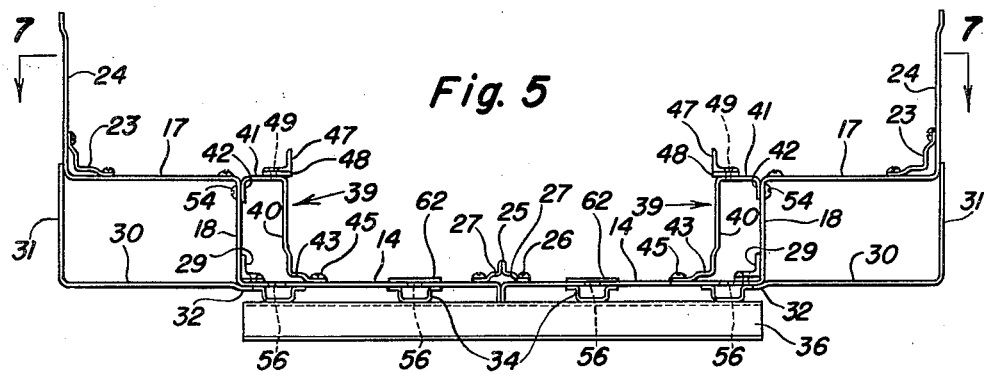
Fig. 5
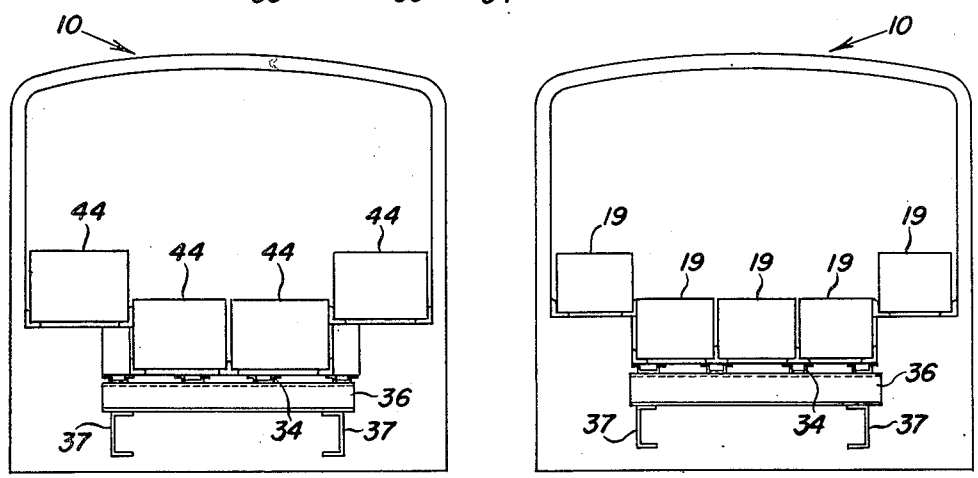
Fig. 4
Fig. 3
INVENTOR.
Robert K. Jack
BY
*Strauch + Hoffman*
Attorneys Nov. 13, 1951  R. K. JACK  2,574,483
CONVERTIBLE TRUCK FLOOR
Filed Oct. 23, 1947  4 Sheets-Sheet 3

INVENTOR.
Robert K. Jack
BY
Strauch & Hoffman
Attorneys

Nov. 13, 1951  R. K. JACK  2,574,483
CONVERTIBLE TRUCK FLOOR
Filed Oct. 23, 1947  4 Sheets-Sheet 4

INVENTOR.
Robert K. Jack
BY
Strauch + Hoffman
Attorneys

Patented Nov. 13, 1951

2,574,483

UNITED STATES PATENT OFFICE 2,574,483

CONVERTIBLE TRUCK FLOOR

Robert K. Jack, Detroit, Mich., assignor to Divco Corporation, Detroit, Mich., a corporation of Michigan Application October 23, 1947, Serial No. 781,713

8 Claims. (Cl. 296—3)

This invention relates to truck bodies, and in particular to one which can be structurally rearranged to provide better stowage for merchandise articles of various sizes.

In the illustrated embodiment, the invention is shown as applied to a milk delivery truck so that the structure within the truck for supporting the cases of milk containers within the truck can be rearranged to support cases of different sizes in the best space conserving manner.

With recent years there has been a marked change-over from the bottling of liquid milk in the conventional large round glass bottles to rectangular glass bottles, or the packaging of it in rectangular waxed cardboard containers. These rectangular containers, whether of glass or waxed cardboard, although holding the same volume of liquid as do the round bottles, are of smaller external dimensions, so that more of them can be stored in the same space that would be occupied by the familiar round bottles. The rectangular containers are generally handled in cases similar to those used for round bottles, but the cases are smaller than the cases for the glass bottles because of the smaller space required by an equal number of rectangular containers. For this reason a larger number of cases of milk can be carried by the same size truck when the milk is bottled in rectangular containers providing that the interior of the truck body can be rearranged to provide the most efficient stowage of the cases with the minimum amount of waste space.

In view of the fact that a dairy does not ordinarily replace all of one type of bottling equipment with another type of bottling equipment at the same time, but usually merely adds the new equipment or substitutes it for obsolescent equipment, the delivery trucks must be adapted to provide the most efficient stowage for either the larger size cases or the smaller size cases.

By means of my invention I have provided a novel truck body construction wherein the interior arrangement of case supporting members may be easily rearranged to efficiently stow either type of case. While the illustrated embodiment of my invention is disclosed in connection with a milk delivery truck, it is to be understood that the principles are equally applicable to providing the most efficient stowage for merchandise of other types, such as bakery products or the like.

It is therefore the primary object of my invention to provide a novel and improved truck body construction which is easily rearranged to provide the most efficient stowage of mechandise articles of different sizes.

It is another object of my invention to provide a truck body with removable structural elements which can be easily removed or replaced to provide the most efficient use of the stowage space within the truck body.

It is another object of my invention to provide a new and improved truck body construction wherein the load supporting floor is greatly strengthened by means which also provides a drainage system to discharge from the floor of the truck body any liquid which has fallen there, as from melted ice or from broken fluid containers or the like.

Other objects will become apparent as the description proceeds in connection with the accompanying drawings, wherein:

Figure 2 is a detailed transverse section through the bottom portion of the truck body of Figure 1.

Figure 3 is a schematic view showing how the load may be disposed in the interior of the truck when the merchandise supporting structure is arranged as in Figures 1 and 2.

Figure 4 is a view similar to Figure 3 but showing the supporting structure within the truck rearranged to support a smaller number of larger cases.

Figure 5 is a view similar to Figure 2, showing in detail the attachments required to provide the stowage of the smaller number of cases as shown in Figure 4.

Figure 1:
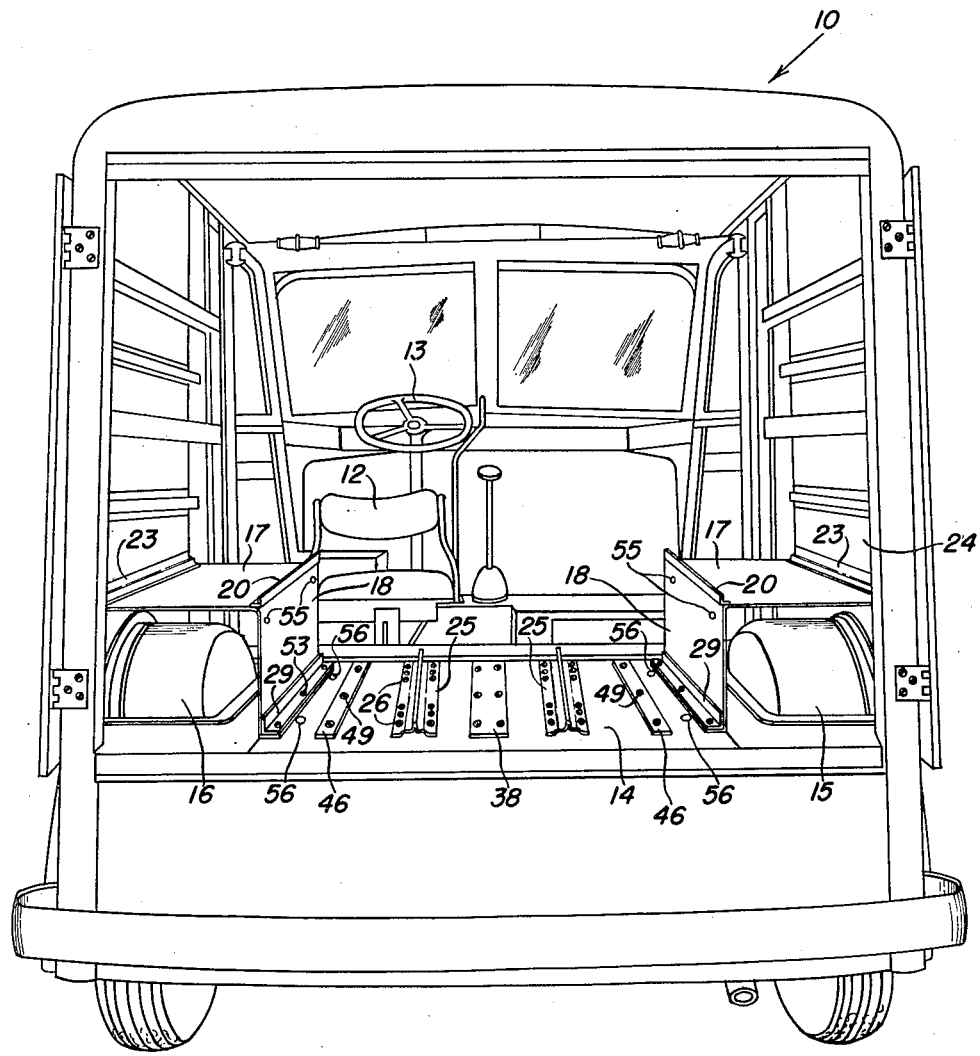
Figure 1 is a general rear view of a truck employing my invention, with the rear doors open so that the general interior arrangement of the load supporting construction is exposed to view.

Referring to Figure 1, the truck body is designated generally by the reference number 10. In its forward portion it has a driver's compartment in which is located a seat 12 and a steering wheel 13. The driver's compartment may be of the "through-aisle" type wherein the driver need step up only one step from the street to enter the compartment and can walk upright across the compartment, and wherein he can drive the truck while standing.

To the rear of the driver's compartment is the stowage space, extending to the rear doors of the truck. The otherwise horizontal floor 14 of the truck body is interrupted by the upwardly extending wheel housings 15 and 16. Each wheel housing is covered by a horizontal shelf 17 which is supported above the floor at its inner end by a vertical wall 18. The width of each horizontal shelf 17 is such that it will support one of the milk bottle cases 19 of Figure 3 when arranged lengthwise thereon, and the distance between the two vertical walls 18 is such that three of cases 19 may be placed side by side. Adjacent its inner edge each horizontal shelf 17 is provided with a removably attached angle member 20 which forms a guide rail and which keeps the cases from sliding off the shelves 17. Adjacent their outer edges the horizontal shelves 17 are provided with rub rails 23 which may be permanently secured in place to the shelves 17 and to the vertical side wall portions 24 of the truck body. The parallel and spaced angle members 20 and rub rails 23 engage the cases at their bottom corners and support the cases slightly above the shelf 17.

A pair of parallel rub rails 25 (Figures 1 and 2) are arranged between the vertical walls 18 and divide the space therebetween into three equal parts so that the cases 19 may be arranged therein as shown in Figure 3.

These rub rails 25 are secured to the floor 14 by machine screws 26 or the like so that the rub rails can be removed when desired. As most clearly shown in Figure 2, each rub rail 25 includes a pair of raised shoulders 27 on opposite sides of its vertical web portion, to receive the bottom corners of the cases 19 and hold the cases above the floor 14 and above the heads of the screws 26.

Referring to Figure 2 it will be seen that one piece of metal is shaped to form half of the floor 14, the vertical wall 18, the horizontal shelf 17 and the vertical side wall section 24. The floor 14 is therefore comprised of two similar abutting sections which are welded together at their mating downturned flanges 28. While the illustrated floor is welded together in this manner, it could be one of one piece construction, so that both vertical walls 18, shelves 17 etc. would be formed from one single metal sheet. In the illustrated embodiment, the joint at the flanges 28 forms a longitudinal stiffening member centrally of the floor.

At the juncture of each floor section 14 and its vertical wall there is provided a rub rail 29 permanently secured in place as by welding. These rub rails 29 serve together with the rub rails 25 to support the cases above the floor 14.

Those outer sections 30 of the truck floor beneath the shelves 17, except where they are interrupted by the wheel housings 15 and 16, are integral with the lower vertical side wall sections 31. These sections 31 overlap and are welded to the lower part of the side wall sections 24. The outer floor sections 30 are coplanar with the central floor 14, and where they meet the central floor they are depressed as at 32 so as to lie under it. The central floor 14 is welded to the outer sections 30 along their depressions 32. The details of the remaining sections of the side walls of the truck body below the sections 31 are not shown in Figure 2.

The central sections of the floor 14 are strengthened longitudinally by a series of four spaced and parallel channel shaped structural members 34 which have their open ends upward. At their upper ends these members have outwardly turned flanges 35 which are welded to the floor 14 to secure the channel members 34 thereto. The bottom webs of the channel members 34 are in turn welded to the top webs of three transverse Z bar girders 36 which rest upon and are welded to the top webs of the longitudinal members 37 (Figures 3 and 4) of the truck chassis.

With the above described arrangement, five rows of the smaller cases may be disposed between the side walls of the truck, to form the lower layer of cases. Additional layers of cases may be stacked on top of the lower layer in the customary manner, the cases usually being provided with mating flanges or the like to facilitate their stacking in vertical arrangement.

Figure 6:
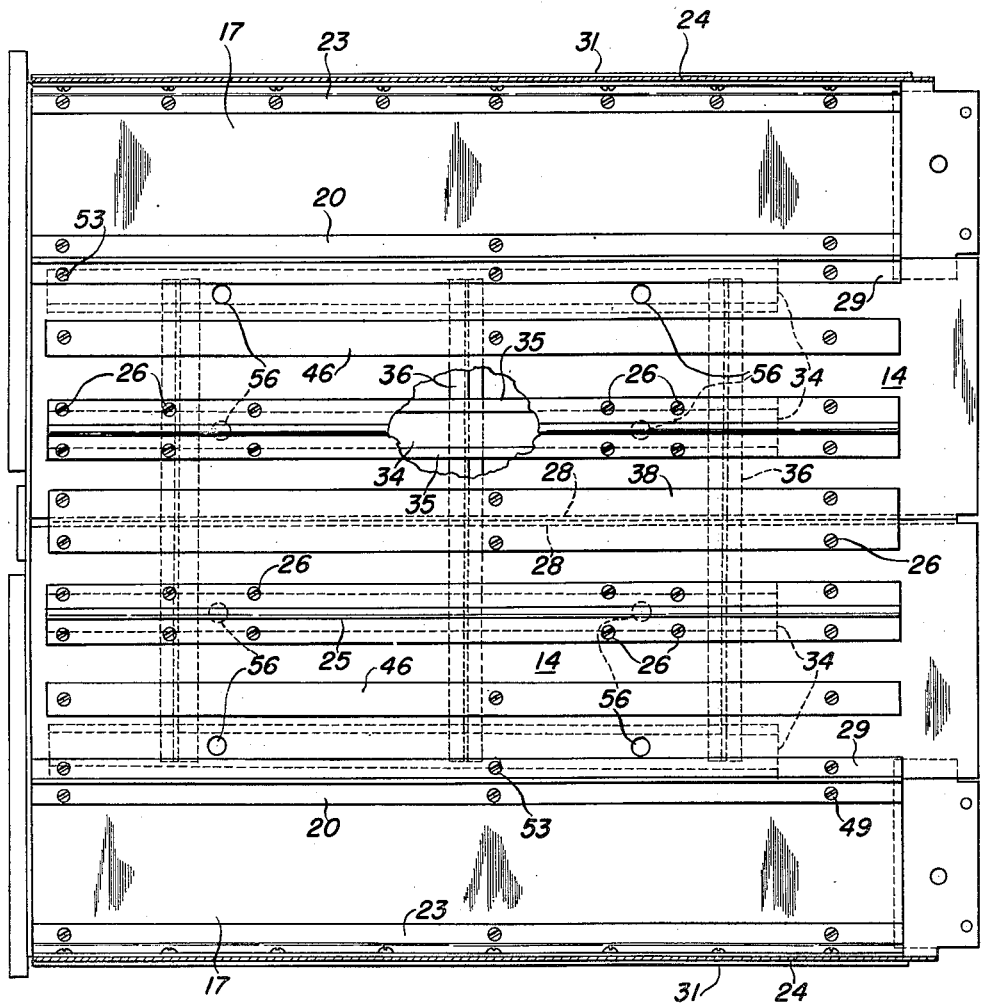
Figure 6 is a top plan view of the floor of the truck arranged as in Figure 2 and taken substantially along the line 6—6 of Figure 2.
Figure 7:
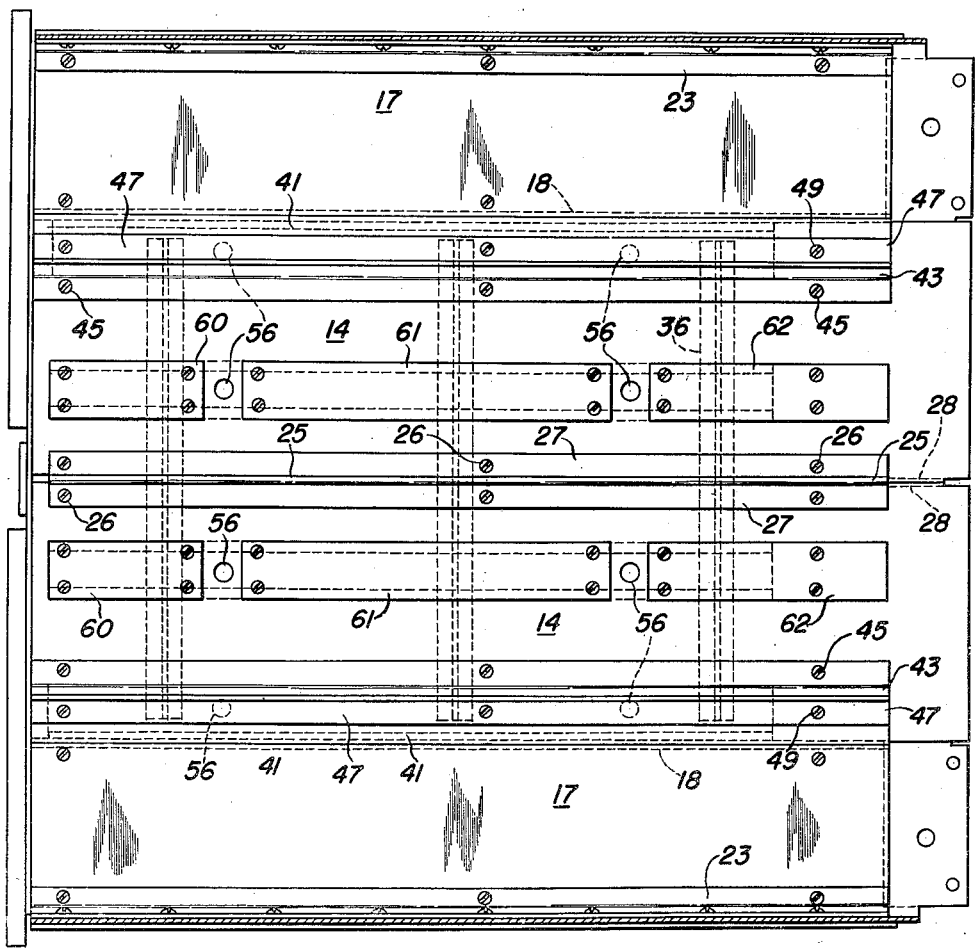
Figure 7 is a top plan view substantially along the line 7—7 of Figure 5.

When it is desired to change the internal construction within the truck body to accommodate only four rows of the larger cases, as shown in Figure 4, the changes shown in detail in Figures 5 and 7 are made. The two rub rails 25 of Figures 1 and 2 are removed by removing the screws 26. One of these rub rails is then secured centrally as shown in Figure 5 replacing the central longitudinal plate 38 shown in Figures 1, 2 and 6.

The two angle members 20 adjacent the tops of the vertical walls 18 are removed and the two removable extensions designated generally at 39 in Figure 5 are installed. Each extension 39 includes a vertical section 40 and an outwardly extending horizontal section 41 terminating in a downwardly extending stiffening flange 42. The horizontal sections 41 lie in the same plane as the adjacent horizontal shelves 17, and the flanges 42 lie against the vertical walls 18 adjacent their tops.

At their bottoms the extensions 39 have a cross sectional shape similar to the rub rails 23, thus forming a rub rail 43 which supports the bottoms of the larger cases 44 (Figure 4) above the floor and above the heads of the screws 45, the rail 43 lying in the same horizontal plane as the raised shoulders 27 on the central rub rail 25. The screws 45 secure the extensions 39 in place, being threaded into the tapped holes which are uncovered when the two longitudinally extending plates 46 of Figures 1, 2 and 6 are removed. The extensions 39 are provided, on the horizontal sections 41 thereof, with angle members 47 similar to the angle members 20 of Figure 2, in fact, the members 20 when removed, may be secured to the extensions 39 to form the members 47. In order to place their supporting surfaces in the same horizontal plane as the rub rails 23, shims 48 (Figure 5) are placed under the angle members and may be made integral therewith as by welding. Both the angle members 20 of Figure 2 and the angle members 47 of Figure 5 are secured in place by flat head machine screws 49 which have their heads fully recessed in countersunk openings through their angle members. The screws 49 are threaded into tapped openings in the horizontal shelf 17 or the horizontal section 41 respectively, so that the angle members are removable.

The rub rails 29 at the bottom of the vertical walls 18 in Figure 2 are provided with shims 52 to raise them to the same level as the raised shoulders 27 on the rub rails 25, and the flathead machine screws 53 which secure them to the floor 14 have their heads fully recessed in countersunk openings through the angle members forming the rub rails 29. In order to further secure the extensions 39 securely in place, the downturned flanges 42 have tapped holes adjacent their front and rear ends to receive machine screws 54 which pass through openings 55 (Figure 1) in the vertical walls 18.

When the truck is used for milk deliveries, ice is frequently placed in the cases to keep the milk cool in warm weather. I have provided means to drain from the truck body the water from the melted ice, or any other fluid such as spilled milk or the like.

The four longitudinal channel members 34 underneath the floor 14 serve to collect water drained from the floor 14 and to discharge it to the ground. The water is discharged from the floor 14 into the channels through drain holes 56, four of which are visible in Figures 1 and 6, and the other four being visible in Figure 7. There are two drain holes 56 above each of the channel members 34. In Figures 1, 2 and 6 the four central drain holes lie under the rub rails 25, while in Figures 5 and 7 the four outer drain holes lie under the extensions 39. Although the drain holes are disposed under the rub rails 25 the water can reach the holes by entering underneath the rub rails at the ends thereof, there being a passage to the drain holes due to the fact that the rub rails are raised in their central section to provide the raised shoulders 27 as clearly shown in Figure 2. In a similar manner the water can easily reach the drain holes under the extensions 39.

The water can flow through the channel members 34 and be discharged through their ends. Openings can also be provided through the bottom webs of the channel members to drain to the ground, but these openings will be longitudinally displaced from the drain holes 56 in the floor 14, so that mud cannot splash upwardly through these openings and into the truck body. The ends of the channels 34 are spaced from the drain holes 56 and no mud can enter the holes 56 from the ends of the channels.

It is one of the objects of the invention to be able to make the change-over from the structural arrangement of Figure 4 to Figure 3 or vice versa with a minimum amount of work. For that reason, all of the tapped holes etc. required for either arrangement are made during the initial construction of the body, and the other parts required for the optional rearrangement may be furnished in kit form. Since there are therefore a considerable number of tapped holes through the floor 14 which are not used in one arrangement but are used in another arrangement, means are provided to plug these tapped holes. Otherwise, some of the water from melting ice etc. would drain through them instead of through the drain holes 55, and mud could splash into them, causing the threads to be corroded, so that a change-over could not be effected rapidly.

Referring to Figures 1 and 2 wherein the extensions 39 are not used, longitudinal strips or plates of metal 46 are fastened to the floor by the same screws 49 that are used in Figure 5 to fasten the extensions 39 to the floor. Another plate 38 is fastened centrally of the floor by the same screws 26 that secure the rub rail 25 of Figure 5. These longitudinally extending plates 46 and 38 also serve to stiffen the floor 14 to reduce the amount of drumming noise resulting from the bouncing of the load when the truck is in motion.

When the extensions 39 are used, as in Figures 4, 5 and 7, the plates 46 and 38 are removed and the extensions 39 and rub rail 25 respectively are substituted for them. Since a single plate substituted for the two rub rails 25 of Figure 2 would cover the four central drain holes 56, a series of three aligned plates 60, 61 and 62 is substituted for each rub rail as best shown in Figure 7, there being a gap between the ends of each pair of plates so as to expose the drain holes 56.

Thus I have provided a novel and improved truck body construction which affords a rearrangement of its component parts so that merchandise articles of different sizes can be stowed in manner to most efficiently use the space within the body. A simple drainage system is provided, and the metallic floor is stiffened to prevent drumming resulting from the rattling of the articles while the vehicle is in motion.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a truck body; means forming a metal floor; means forming the side walls of the body; wheel housings protruding upwardly above said floor adjacent said side walls; horizontal shelves above each wheel housing, the outer edges thereof being supported by said side walls; vertical members supporting the inner edges of said shelves above said floor, the width of said floor between said vertical members being a whole multiple of the width of one of said shelves; and means for extending the width of each horizontal shelf, each comprising an angularly shaped extension having a horizontal section in the same plane as said shelf and connected thereto and a vertical section extending from the inner edge of the extension to said floor, the width of said floor between said vertical sections being a whole multiple of the width of one of said shelves with its extension.

2. In a truck body; means forming a metal floor; a pair of horizontal shelves on opposite sides of and at a different level than said floor, the width of said floor being a whole multiple of the width of one of said shelves; and removable extension members for said shelves, extending horizontally towards each other in the same plane as said shelves to increase the width of said shelves, said extensions having spaced vertical sections extending from their inner ends to said floor, the width of said floor between said vertical sections being a whole multiple of the width of one of said shelves with its extension.

3. In a truck body construction; a section of sheet metal formed to provide a floor; a shelf spaced above said floor; a vertical wall connecting said shelf and said floor, said shelf also being connected to a portion of the body side wall; parallel rub rails secured to the top of said shelf and extending longitudinally thereof adjacent said vertical and side walls; parallel rub rails secured to said floor longitudinally thereof, one of said last mentioned rub rails being secured at the juncture of said floor and vertical wall; and means for extending the width of said shelf comprising a formed sheet metal element having a horizontal section in the same plane as said shelf and a vertical section adapted to be secured to said floor, the lower portion of said vertical section being shaped to provide a longitudinal rub rail.

4. In a truck body construction; a section of sheet metal formed to provide a floor; a shelf spaced above said floor; a vertical wall connecting said shelf and said floor, said shelf also being connected to a portion of the body side wall; parallel rub rails secured to the top of said shelf and extending longitudinally thereof adjacent said vertical and side wall; parallel rub rails secured to said floor longitudinally thereof, one of said last mentioned rub rails being secured at the juncture of said floor and vertical wall and the other of said last mentioned rub rails secured to said floor being removable; and means for securing said removable rub rail to said floor at a second location.

5. In a truck body; means forming a metal floor; longitudinally extending stiffening members secured to the underside of said floor; a pair of oppositely disposed vertical walls defining the side limits of said floor; rub rails secured at the junctures of said walls and floor and operative to guide and support articles of merchandise above said floor; at least one rub rail extending longitudinally of said floor and operative to support articles of merchandise above said floor; a horizontal shelf on each side of said floor, extending from said vertical wall outwardly; rub rails defining the side limits of said shelf; means forming a horizontal extension for a shelf, comprising an angularly shaped member disposed with one leg coplanar with a shelf and the other leg disposed vertically and engaging said floor; and means for securing said other leg to the floor, said other leg where it engages said floor being shaped to provide a rub rail operative to guide and support articles of merchandise above the floor.

6. A structural member adapted to provide a shelf extension for a shelf in a truck body, said member having a horizontal portion terminating on one side in a downwardly depending flange and on the other side in a downwardly extending vertical wall, said vertical wall terminating at its lower end in a flange extending outwardly from said vertical wall in the opposite direction from that of said horizontal portion, said flange including a horizontal outer portion adapted to be secured to a horizontal surface, said flange also including an intermediate portion having horizontal and vertical sections forming an angular rub rail spaced above the plane of the horizontal portion of said flange.

7. In a truck body construction; a section of sheet metal shaped to provide a floor; a shelf connected to said floor by a vertical wall; parallel stiffening members secured to the underside of said floor, said stiffening members being channel-shaped with their open ends upward and extending longitudinally of said floor; drain holes in said floor, said holes being disposed over said channel-shaped stiffening members; means displaced horizontally from said drain holes in said floor for draining liquids from said channel-shaped stiffening members; and a series of transversely extending girders secured to said stiffening members, said girders being adapted to be secured to a vehicle frame.

8. In a truck body construction adapted to accommodate, alternately, articles of merchandise of two different widths in substantially contiguous relation; opposite wall members; a floor; opposite shelves above the level of said floor, the outer edges thereof being supported by said wall members; vertical members extending between the inner edges of said shelves and said floor, defining the inner edge of said shelves and the outer edges of said floor so that the width of one of said shelves is substantially equal to the width of one of said articles of merchandise, the floor being a whole multiple of the width of one of said shelves; removable extensions for said shelves; vertical members extending between said extensions and said floor, spaced so that the extended width of one of said shelves is substantially equal to the width of the other of said articles of manufacture, the width of the floor being a whole multiple of the extended widths of one of said shelves.

ROBERT K. JACK.

REFERENCES CITED

The following references are of record in the file of this patent:

UNITED STATES PATENTS

| Number | Name | Date |
|---|---|---|
| 1,287,924 | Eber | Dec. 17, 1918 |
| 1,908,457 | Swift et al. | May 9, 1933 |
| 2,112,101 | Kliesrath | Mar. 22, 1938 |
| 2,152,568 | Renno | Mar. 28, 1939 |
| 2,233,323 | Nicol | Feb. 25, 1941 |
| 2,362,077 | Ledwinka et al. | Nov. 7, 1944 |
| 2,405,358 | Johnson | Aug. 6, 1946 |

FOREIGN PATENTS

| Number | Country | Date |
|---|---|---|
| 438,992 | France | Mar. 28, 1912 |
| 728,625 | France | Jan. 29, 1932 |